US010898025B2

(12) United States Patent
Steiner

(10) Patent No.: US 10,898,025 B2
(45) Date of Patent: Jan. 26, 2021

(54) APPARATUS WITH AN OUTLET PARTICULARLY FOR MILK FROTH, AND A COFFEE MACHINE

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 137 days.

(21) Appl. No.: 16/024,998

(22) Filed: Jul. 2, 2018

(65) Prior Publication Data

US 2019/0008313 A1 Jan. 10, 2019

(30) Foreign Application Priority Data

Jul. 6, 2017 (CH) .......................................... 00876

(51) Int. Cl.
*A47J 31/44* (2006.01)
*A23F 5/24* (2006.01)

(52) U.S. Cl.
CPC ............. *A47J 31/4496* (2013.01); *A23F 5/24* (2013.01); *A47J 31/4485* (2013.01)

(58) Field of Classification Search
CPC .... A47J 31/468; A47J 31/402; A47J 31/4485; A47J 31/4482; A47J 31/4496; A47J 31/469
USPC ......... 99/280, 281, 282, 283, 284, 286, 293, 99/307, 452, 453, 454, 455, 495; 426/231, 250, 590
See application file for complete search history.

(56) References Cited

U.S. PATENT DOCUMENTS

| 4,681,028 | A | 7/1987 | Schmed et al. |
| 4,892,031 | A | 1/1990 | Webster et al. |
| 4,910,661 | A | 3/1990 | Barth |
| 5,367,947 | A | 11/1994 | Lussi et al. |
| 5,931,080 | A * | 8/1999 | Roure Boada ...... A47J 31/4485 99/293 |
| 5,957,033 | A | 9/1999 | In-Albon |
| 6,298,769 | B1 | 10/2001 | Stettes et al. |
| 7,017,474 | B2 | 3/2006 | Comte |
| 7,472,641 | B2 | 1/2009 | Doglioni Majer |
| 7,475,628 | B2 | 1/2009 | Lussi |
| 8,146,485 | B2 | 4/2012 | Ozanne et al. |

(Continued)

OTHER PUBLICATIONS

Vlag, Youri, A Guide to Latte Art—Free Pour, Dec. 3, 2007.

*Primary Examiner* — Phuong T Nguyen
(74) *Attorney, Agent, or Firm* — Brian Roffe

(57) ABSTRACT

An apparatus is provided with an outlet, in particular for milk froth, which apparatus can be moved in two or three coordinate directions (x, y, z) using a control unit. When dispensing the fluid, a graphic pattern can thus be created automatically on the surface of the beverage dispensed into the container, preferably coffee. A pivotably housed guide sleeve and a hose element are provided with the outlet, which element can be pivoted in the sleeve and through which element the milk froth passes. This outlet can be moved with the hose element and the guide sleeve in a plane in these two coordinate directions (x, y) above the container in controlled manner, and the milk froth can thus be dispensed into the container. The result is a compact structure of the apparatus and this can be integrated into a coffee machine in a very space-saving manner.

20 Claims, 2 Drawing Sheets

(56) References Cited

U.S. PATENT DOCUMENTS

| | | | |
|---|---|---|---|
| 8,479,643 B2 | 7/2013 | Aemisegger et al. | |
| 8,925,141 B2 | 1/2015 | Steiner | |
| 9,532,678 B2 | 1/2017 | Steiner | |
| 9,622,618 B2 | 4/2017 | Steiner | |
| 2009/0202686 A1* | 8/2009 | Lavie | B41M 3/006 426/231 |
| 2011/0256289 A1 | 10/2011 | Steiner | |
| 2012/0171383 A1 | 7/2012 | Christensen et al. | |
| 2013/0103198 A1 | 4/2013 | Nakamoto et al. | |
| 2014/0116475 A1 | 5/2014 | Steiner | |
| 2015/0327715 A1 | 11/2015 | Steiner | |
| 2017/0164644 A1 | 6/2017 | Steiner | |
| 2018/0098659 A1 | 4/2018 | Steiner | |

* cited by examiner

APPARATUS WITH AN OUTLET PARTICULARLY FOR MILK FROTH, AND A COFFEE MACHINE

FIELD OF THE INVENTION

The invention relates to an apparatus with an outlet, particularly for milk froth, having a control unit that which can move the outlet spatially in two or three coordinate directions (x, y, z), with the result that, when dispensing the fluid, a graphic pattern can be created automatically on the surface of the beverage dispensed in the container, which is preferably coffee.

The present invention also relates generally to a coffee machine having such an apparatus, more specifically, with a housing having a front wall in front of which a main beverage outlet and a support surface of a drip pan or the like is arranged thereunder, for a container to be positioned thereon and to be filled.

BACKGROUND OF THE INVENTION

When preparing coffee with a coffee machine, in particular milk froth is added to the dispensed coffee by hand from a jug or the like, such that a graphic pattern, which is known by the name "latte art", appears on the coffee. The design and configuration of the pattern is determined by the creativity and skill of the person carrying out the task. This type of preparation is time-consuming and requires a lot of practice until a person can create the desired motifs attractively.

On this basis, in a method and a device for pouring out milk froth according to document EP 2 893 857, it is disclosed to create such motifs by machine. In so doing, the outlet for the milk froth is guided, by automatic control, above the surface of the cup filled with coffee. The apparatus for moving the outlet is designed as a robot. The milk froth can thus be dispensed automatically by means of a device controlled spatially in two or three coordinate directions (x, y, z) and the pattern can be created. EP 2 893 857 corresponds to U.S. patent application Ser. No. 14/553,462, published as U.S. Pat. Appln. Publ. No. 20150327715, which is incorporated by reference herein.

OBJECTS AND SUMMARY OF THE INVENTION

An object of the present invention is to develop an apparatus by means of which a simplified design and compact structure for automatic production of patterns is achieved, wherein the functionality required for the desired purpose of being able to pour a fluid on any point in targeted manner within a predetermined surface is intended to be retained.

According to the invention, the object is achieved by providing the apparatus with a pivotable and/or displaceably housed guide sleeve and at least one hose element through which milk froth passes and which can be displaced in the guide sleeve, having the outlet which can be moved with the hose element and the guide sleeve in at least one plane in these two coordinate directions (x, y) in controlled manner by the control unit above the container. In so doing, in particular the milk froth can be dispensed into the container.

The described apparatus for pouring a fluid, in particular for targeted application of a second beverage component on the surface of a first beverage component, for example milk froth on the surface of coffee, is characterized by its compact structure. The design with pivotable guide sleeve and the milk froth hose contained therein is extremely slim and requires little space. Due to the resulting compact structure, the apparatus can also be integrated into beverage outlets of coffee machines.

The main beverage outlet is connected to a preparation unit for coffee and the hose element is connected in particular to a milk frother in the coffee machine.

With the process of the controlled movement of the second beverage outlet, same is pivoted tangentially about an axis of rotation and moved radially, separately, in respect of the axis of rotation, or a controlled combination of the named movement processes takes place. For this purpose, a hose element which comprises the second beverage outlet extends within the guide sleeve, and/or the hose element within the guide sleeve shifts in a translational motion along the longitudinal extension of the guide sleeve, or a combination of the named movement processes is carried out. In particular, only part of the hose element extends along its longitudinal extension within the guide sleeve. This graphic pattern can be created, for example in the form of a figural or ornamental representation, by controlling the movement of the second beverage outlet.

Programs for creating specific patterns can be predetermined in the control device which actuates drive units for the tangential and radial movement of the second beverage outlet with this controlled movement, which advantageously brings about a synchronous movement of this beverage outlet in the radial and tangential direction.

The described method can also comprise translational movement of the second beverage outlet perpendicular to the surface in which the guide sleeve is pivoted. For example, the height of the second beverage outlet above a surface on which the second beverage component is applied can thus be adjusted to a definable distance.

BRIEF DESCRIPTION OF THE DRAWINGS

The invention and the additional advantages thereof are explained below in greater detail using an embodiment example with reference to the drawings. The drawings show the following.

DETAILED DESCRIPTION OF THE INVENTION

Figure 1:
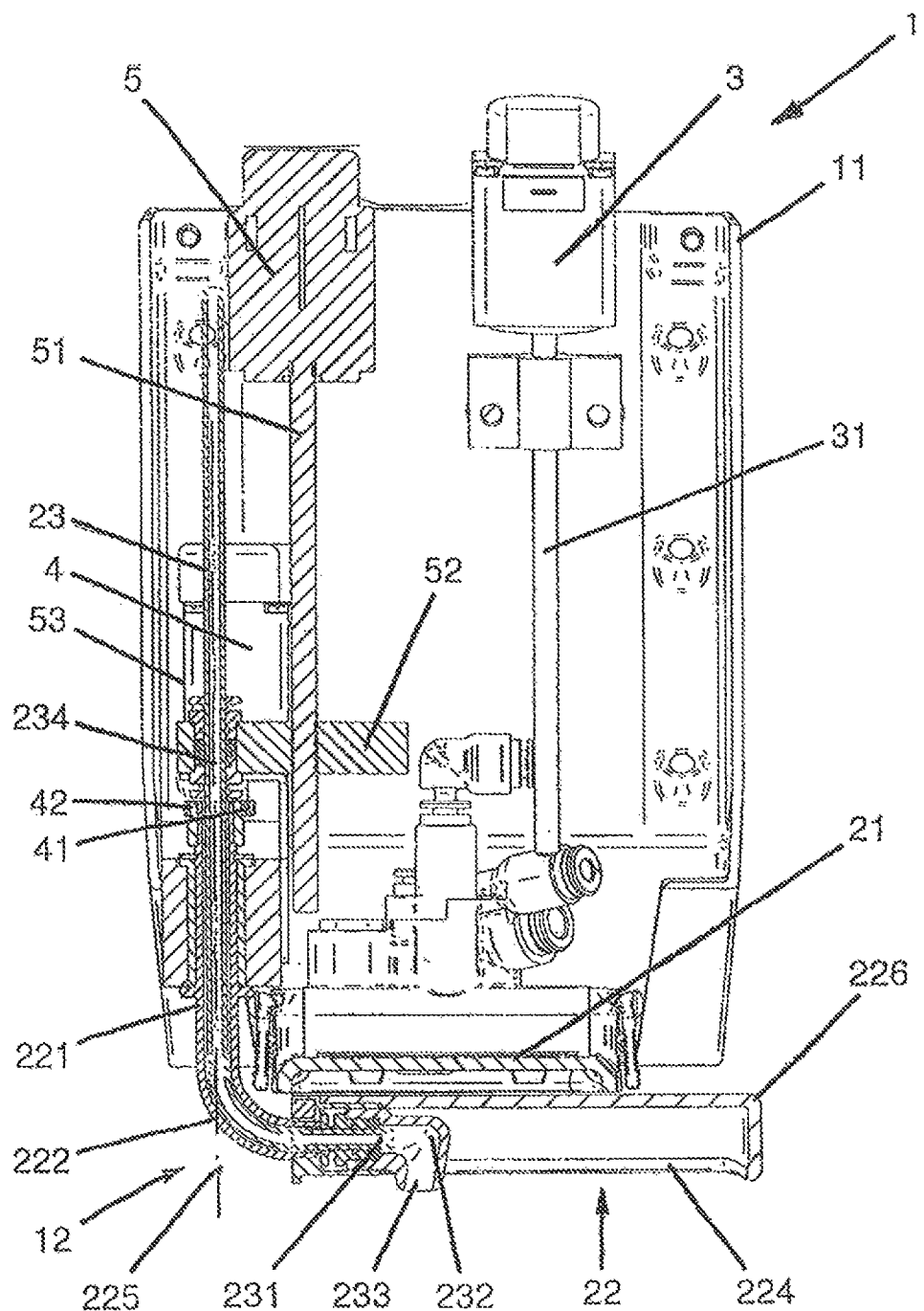
FIG. 1 is a view and a partially longitudinal section of an apparatus according to the invention as part of a coffee machine.
Figure 2:
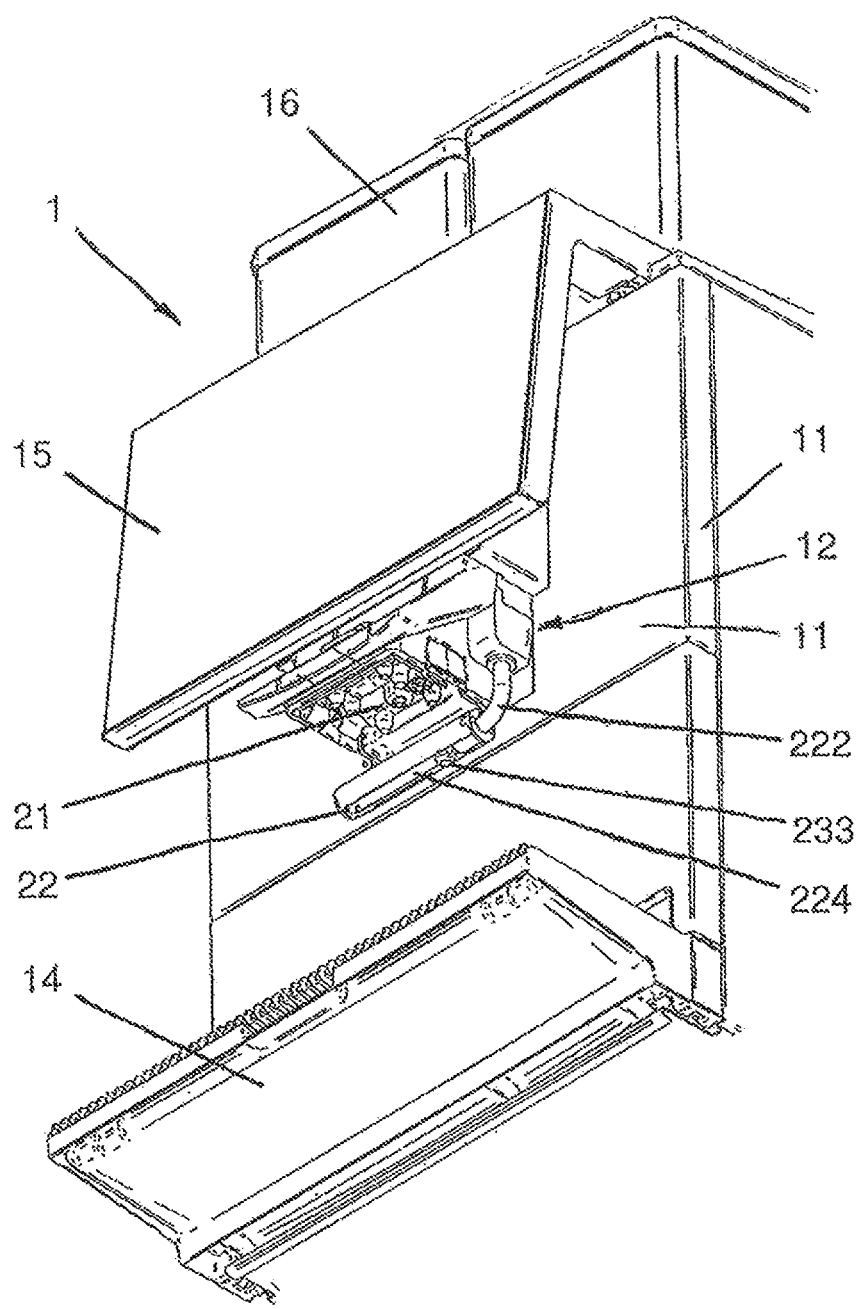
FIG. 2 is a perspective view of the front side of a coffee machine with an apparatus according to FIG. 1.

FIG. 1 shows a part and FIG. 2 shows the front side of a coffee machine 1 with a housing 11, a front wall 11' and an apparatus 12 arranged on the front wall 11'. The coffee machine 1 equipped with conventional components, such as a preparation unit for coffee and a preparation unit for milk, preferably a milk frother, is therefore not explained in greater detail.

In FIG. 2, an operating and control unit 15 with a display, two coffee bean containers 16, a main beverage outlet 21 and a drip pan 14 can be seen on the coffee machine 1.

The apparatus 12 with an outlet 233 for a fluid, in particular for milk froth or similar beverages, is provided with a control unit which can move the outlet 233 spatially in two or three coordinate directions x, y, z, such that a graphic pattern can be created automatically on the surface of the beverage dispensed into the container, preferably coffee, when the fluid is being dispensed. In particular, milk froth is dispensed to create a cappuccino or similar beverage. However, this can also be a creamy fluid.

The vertical position of the apparatus 12 can be adjusted in the z-direction in the housing 11 by a drive 3 with a spindle 31. In such a way, the apparatus 12 can be brought into a position above an application surface of the coffee machine 1 suitable for different sizes of container, in order for it to be possible to place cups or containers of different sizes thereon. In the process, the apparatus 12 can be set to an advantageous position above the rim of the cup. This can also take place by automatically setting the z-position if the size of the container height can be determined by an integrated measuring element.

According to the invention, a pivotable guide sleeve 22, and a displaceable hose element 23 through which the fluid passes, which hose element 23 can be shifted in the guide sleeve 22, is provided with the outlet 233 formed as an outlet head. This outlet 233 can thus be moved with the hose element 23 and the guide sleeve 22 in a controlled manner in a plane in these two coordinate directions x and y by the control unit 15, and the milk froth can be dispensed above the container.

Advantageously, the guide sleeve 22 is held by a sleeve part 222 angled at approximately 90°, which sleeve part 222 is housed rotatable about an axis of rotation 225, and can be rotated by a motor drive 4 controlled by the control unit 15. This flexible hose element 23, which at its end which is not shown is fluidically connected to the preparation unit for the milk, extends into the bent sleeve part 222. The bent sleeve part 222 functions as a guide sleeve for the hose element 23. The sleeve part 222 comprises a segment 221 which is housed rotatable about the perpendicular axis of rotation 225. When the guide sleeve 22 rotates about the axis of rotation 225, this describes a circular ring-shaped, or circular ring segment-shaped, surface below the main beverage outlet 21.

A port of a cap 232 of outlet 233 protrudes through the longitudinal slot 224 and is thus guided therein. By applying a tensile or pressure force in the longitudinal direction of the hose element 23 in a region 234 of the flexible hose element 23, the outlet 233 at the end of the hose element 23 can be moved along the longitudinal direction of the guide sleeve 22.

Furthermore, the outlet 233 can be adjusted by pivoting the guide sleeve 22 about the axis of rotation 225 in a tangential direction. It can thus be positioned at any point within a circular ring or a circular ring segment in controlled manner, wherein the circular ring or the segment is specified by the extension and position of the longitudinal slot 224 relative to the axis of rotation 225, as well as the pivot range of the guide sleeve 22. In the process, the pivot range and length and radial arrangement of the longitudinal slot 224 are selected such that the outlet 233 can be moved over the entire surface of a container positioned as intended on a supporting surface below the device and/or approximately above the complete diameter range of the container which can be positioned thereunder.

The described apparatus for conveying the fluid, which comprises the guide sleeve 22 and the hose element 23, is furthermore equipped such that the method and positioning of the outlet 233 can take place automatically and in controlled manner within the named surface. For this purpose, a drive unit 4 for the tangential adjustment of the position of the outlet 233 and/or for rotating or pivoting the guide sleeve 22 about the perpendicular axis of rotation 225 is arranged on the apparatus 12. For this purpose, for example, a pinion 41 is arranged on the axle of a motor which pinion engages, with its toothing, the toothing of a toothed element 42, which in turn is coupled, in rotationally fixed manner, to the proximal segment 221 of the guide sleeve 22 which is parallel to the axis of rotation. The drive unit 4 causes a pivoting of the guide sleeve 22 about the perpendicular axis of rotation 225 and thus a tangential displacement of the dispensing opening 233.

An additional drive unit 5 is coupled to a threaded spindle 51 in order to rotate about its longitudinal axis. A nut 52, which is supported on a strut 53 to prevent rotation about the longitudinal axis of threaded spindle 51, is connected to the threaded spindle 51. An axial movement of the nut 52 is caused when the threaded spindle 51 undergoes rotational movement. This nut 52 is coupled to the segment 234 of the flexible hose element 23, which is thus moved in its longitudinal direction by the drive unit 5, resulting in a radial movement of the dispensing opening 233 in respect of the axis of rotation 225.

The drive units 4 and 5 can be operated by the control unit 15 in alternating or simultaneous manner and at different speeds for the outlet 233 in tangential and radial direction such that the outlet 233 follows a defined path on a horizontal plane below the main beverage outlet 21.

If a beverage component, in particular milk froth, is guided continuously or intermittently through the hose element to this outlet 233 during the movement of the outlet 233, a pattern from this beverage component is produced on a surface below the outlet. If, accordingly, in a first step for example coffee is dispensed into a cup by the main beverage outlet and then milk froth is dispensed by the outlet 233, which can be moved along a specific path in controlled manner, any esthetically appealing milk froth pattern can be created, automatically and precisely, on the surface of the coffee.

This milk frother is advantageously designed such that the milk froth consistency can be adjusted variably in order that the pattern can always be generated in an optimal manner. For example, this can be changed and set by controlling the quantity of supply air.

The housing part 226 of the guide sleeve 22 with the longitudinal slot 224 can be removed, is removable and the cap 232 forming the outlet 233 is also detachably connected to the flexible hose element 23. Therefore, cleaning of same can be made easier and hygiene can be improved.

After drive units 4 and 5 have been programmed to adjust the dispensing opening for the milk froth to create specific patterns, the apparatus requires no additional manipulation by the user except to select the pattern to be created.

As FIG. 2 shows, the guide sleeve 22 is arranged with the outlet 233 such that it is pivoted back to the front wall 11' in idle state such that the space below the main beverage outlet 21 is clear in order to be able to dispense coffee or the like into the container without obstruction. In the process, the guide sleeve 22 is aligned approximately parallel to the front wall 11'. A closable recess in the wall into which the guide sleeve 22 could be pivoted could also be provided.

The invention can also be illustrated by other variants. Therefore, instead of being pivotable about the axis of rotation, the guide sleeve 22 could in theory also be arranged adjustable, even displaceable, or additionally displaceable, in at least one direction, not shown in greater detail. Advantageously starting from the idle position in which the guide sleeve 22 is against the wall of the coffee machine, it would be displaced in the horizontal plane away from the wall with a controllable, changeable stroke, with the result that the guide sleeve 22 and the outlet, which can be longitudinally moved therein, could generate this pattern above the container contents.

As a variant, two or more of such hose elements 23, each having an outlet, could be arranged next to one another in the guide sleeve 22 so as to be displaceable in the longitudinal direction thereof. A larger surface of the dispensed coffee could thus be covered simultaneously with milk froth or two different fluids could also be dispensed independently of each other, for example milk froth and chocolate cream or the like.

The invention claimed is:

1. An apparatus for dispensing a fluid while generating a graphic pattern from the fluid on a surface of a beverage, the apparatus comprising:
    a pivotable or displaceable guide sleeve;
    at least one hose element through which the fluid passes, the at least one hose element being at least partly situated in the guide sleeve and displaceable in relative to the guide sleeve, each of the at least one hose element having an outlet in that part situated in the guide sleeve; and
    a control unit configured to control displacement of the at least one hose element and pivoting or displacement of the guide sleeve such that the outlet of each of the least one hose element is movable with the hose element and the guide sleeve in two coordinate directions in a controlled manner.

2. The apparatus according to claim 1, wherein the guide sleeve has at least one sleeve part angled at approximately 90° and which is rotatable about an axis of rotation, the apparatus further comprising a motor drive controlled by the drive unit to rotate the at least one sleeve part in a controlled manner and thereby provide for pivoting of the guide sleeve.

3. The apparatus according to claim 2, wherein the at least one hose element extends through the guide sleeve and the at least one sleeve part, the apparatus further comprising a drive unit coupled to the at least one hose element and controlled by the control unit for moving the at least one hose element to any one of the different positions relative to the guide sleeve.

4. The apparatus according to claim 1, wherein the at least one hose element extends through the guide sleeve, the apparatus further comprising a drive unit coupled to the at least one hose element and controlled by the control unit for moving the at least one hose element to any one of a plurality of different positions relative to the guide sleeve.

5. The apparatus according to claim 1, wherein the guide sleeve has a longitudinal slot through which the outlet of the at least one hose element extends and is guided therein.

6. The apparatus according to claim 1, wherein the guide sleeve is pivotable and displaceable in a translational motion perpendicular to a plane in which the guide sleeve pivots.

7. A coffee machine, comprising:
    the apparatus according to claim 1,
    a housing having a front wall in front of which a main beverage outlet from which the beverage is dispensed is arranged and a support surface of a drip pan is arranged thereunder, a container into which the beverage is dispensed and then onto which the fluid is dispensed being positionable on the drip pan,
    wherein the guide sleeve with the outlet is pivotable and arranged such that, during controlled movement, the guide sleeve and the outlet are located below the main beverage outlet, and the guide sleeve is pivoted back against the front wall in the idle state, in order that the space below the main beverage outlet is clear in order to dispense the beverage into the container when present without obstruction.

8. The coffee machine according to claim 7, wherein the guide sleeve is positioned approximately parallel directly in front of the front wall in the idle state, or is configured to be pivotable into a recess in the front wall.

9. The coffee machine according to claim 7, wherein the guide sleeve includes a segment arranged in the housing, further comprising a drive for adjusting a vertical position of the apparatus into any one of a plurality of different positions relative to the drip pan on which the container is positioned during dispensing of the beverage from the main beverage outlet and dispensing of the fluid from the outlet of the at least one hose elements onto the beverage after having been dispensed into the container.

10. The coffee machine according to claim 7, wherein the guide sleeve has a longitudinal slot through which the outlet of the at least one hose element extends and is guided therein, the guide sleeve or the longitudinal slot and a displacement path of the at least one hose element being dimensioned relative to the container when present such that the outlet is movable over approximately an entire diameter range of the container when present.

11. The apparatus according to claim 1, wherein the fluid is milk froth and the beverage is coffee.

12. The apparatus according to claim 1, wherein the least one hose element has a longitudinal extension that is partly situated in the guide sleeve, the longitudinal extension of the at least one hose element including the outlet and being movable longitudinally within the guide sleeve.

13. The apparatus according to claim 1, wherein the guide sleeve has a longitudinal slot through which the outlet of the at least one hose element extends and is guided therein.

14. The apparatus according to claim 1, wherein the at least one hose element is flexible and partly housed within the guide sleeve, the part housed within the guide sleeve being movable relative to the guide sleeve.

15. The apparatus according to claim 1, wherein the guide sleeve includes a longitudinal slot and each of the at least one hose element includes a cap associated with the outlet and which protrudes through the longitudinal slot of the guide sleeve.

16. The apparatus according to claim 1, wherein the control unit is configured to move the at least one hose element relative to and along the guide sleeve by applying a tensile or pressure force in a longitudinal direction of the at least one hose element.

17. The apparatus according to claim 1, wherein the at least one hose element is connected to the guide sleeve and movable in a longitudinal direction of the guide sleeve.

18. The apparatus according to claim 1, wherein the guide sleeve is pivotable about one end region at which the at least one hose element passes into an interior of the guide sleeve, the control unit being configured to control the pivoting of the guide sleeve.

19. The apparatus according to claim 1, wherein the control unit is configured to provide for automatic generation of the graphic pattern by the fluid being dispended from the outlet of each of the at least one hose element.

20. The apparatus according to claim 1, wherein upon controlled displacement of the at least one hose element relative to the guide sleeve by the control unit, the at least one hose element has, while partly in the guide sleeve, different positions relative to the guide sleeve and the outlet of each of the least one hose element is movable spatially with the hose element and the guide sleeve in at least one plane in the two coordinate directions.

* * * * *